Nov. 21, 1939. B. F. BRUGGERMAN 2,180,665
ELECTRICALLY HEATED TOOL
Filed Feb. 1, 1939
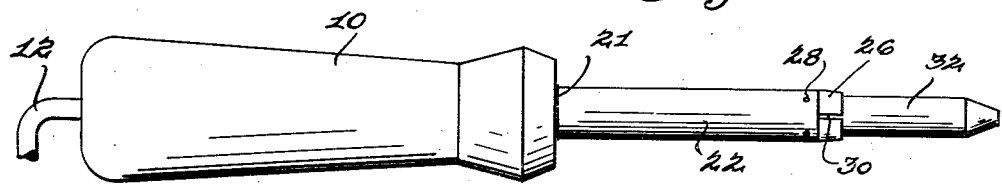
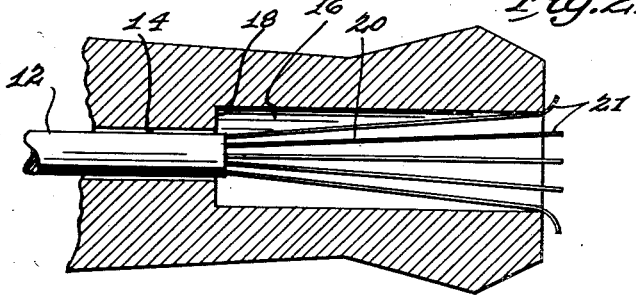
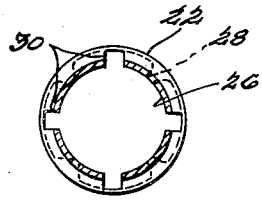
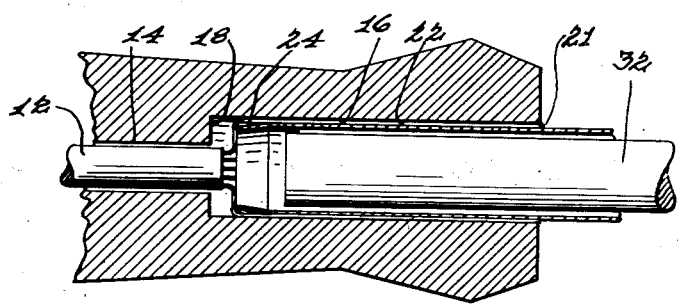
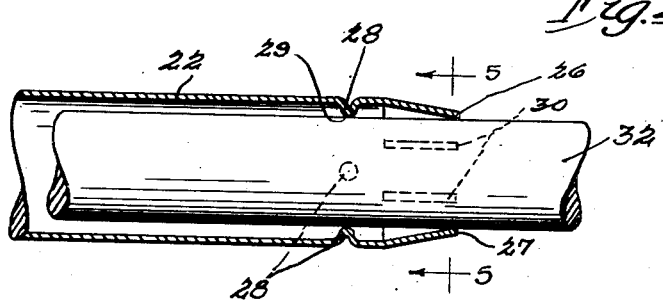
Inventor
Bertrand F. Bruggerman
By
Q. P. Schulze  Attorney Patented Nov. 21, 1939

2,180,665

UNITED STATES PATENT OFFICE 2,180,665

ELECTRICALLY HEATED TOOL

Bertrand F. Bruggerman, Los Angeles, Calif.

Application February 1, 1939, Serial No. 254,092

6 Claims. (Cl. 219—26)

This invention relates to improvements in electrically heated tools, and more particularly to hand tools for soldering, welding and the like having an electrically heated working head such as a carbon tip.

An object of the invention is to provide a device wherein the various parts thereof may be readily and securely joined together without the necessity as heretofore of using screws or any other extraneous fastening means and which is otherwise of exceedingly simple construction and inexpensive in cost of manufacture.

Another object is to provide a tool of the above character having parts thereof air-cooled and arranged so that heat from the working head does not interfere with handling or manipulation of the tool. More particularly, the invention comprehends the provision of a carbon tip supporting sleeve or shank which is adapted to adjustably and frictionally support the tip in a manner to form a circumferential air pocket around the tip concentric with the inner wall of the sleeve.

Other and further objects and advantages of the invention will become apparent from the following detailed explanation taken in conjunction with the accompanying drawing, wherein a preferred embodiment of the principles of the invention has been selected for exemplification.

In the drawing:

Fig. 1 is a side elevational view of a tool as contemplated by the present invention;

Fig. 2 is an enlarged fragmentary section of the handle and conduit as shown in Fig. 1 but prior to association therewith of the carbon tip supporting sleeve;

Fig. 3 is an enlarged fragmentary section similar to Fig. 2 but having the carbon tip supporting sleeve associated therewith;

Fig. 4 is an enlarged fragmentary section of the free end of the sleeve of Figs. 1 and 3, showing the manner of supporting the carbon tip; and Fig. 5 is a sectional view of the sleeve illustrated in Fig. 4 and taken on the line 5—5 of Fig. 4, looking in the direction of the arrows.

Referring more particularly to the drawing, wherein like numerals refer to like parts, 10 represents an electrically insulated handle which may be of any suitable configuration and size and receiving a sheathed multi-wire electric current conduit 12 in bore 14 provided preferably centrally and longitudinally of the handle 10 and through which the conduit is inserted. Coaxial of the bore 14 is a counterbore 16 providing an enlarged mouth and forming a shoulder 18 inside the handle. The free end portions of the wires 20 of conduit 12 which project into the counterbore 16 are unsheathed and spread outwardly against the wall of the counterbore with the extremities 21 thereof preferably extending beyond the counterbore outside the handle 10 for a slight distance for a purpose hereinafter apparent.

A hollow sleeve or shank 22 formed of brass or other suitable material is of slightly less diameter than the diameter of the counterbore 16. When securing together sleeve 22 and the handle 10, the conduit wires 20 may be arranged as shown in Fig. 2 and the tapered end 24 of sleeve 22 passed inside the flared wire ends 21, inserted in the counterbore 16, forcing the wires 20 further outwardly against the wall of the counterbore, whereupon the wires 20 become tightly wedged between the sleeve 22 and counterbore 16 to make efficient current conducting contact with the metal sleeve or shank 22 and to serve as a packing means frictionally holding the sleeve 22 in the counterbore of the handle. Shoulder 18 operates as a stop for the inserted sleeve 22 and, if desired, the sleeve may be driven into the counterbore so that the wires 20 are tightly pressed between the tapered end 24 of the sleeve 22 and the shoulder 18. In the above novel assembly, the sleeve is securely held in the handle without resorting to the use of any extraneous fastening means such as conventional screws or the like, and the electric current conduit when distorted in the manner described is caused to serve the two-fold function of conducting current to the metal sleeve and frictionally holding the sleeve in the handle.

The free end 26 of the sleeve 22 is tapered inwardly, and tapering thereof is facilitated by the provision of slots 30 arranged axially at the end of the sleeve which are primarily intended for a purpose which will hereinafter appear. Provided in the body portion of the sleeve and preferably at a point proximate to the free or outer end 26 is an inwardly extending means which may take the form of inwardly projecting protuberances 28 pressed from the wall of the sleeve. The extremities 29 of the indentations or protuberances 28 are in axial alignment with the inner edges 27 of the sleeve end 26 so that, when the carbon tip or other working head 32 is inserted in the sleeve 22, it is engaged by the surfaces 27 and 29 at a plurality of points on its circumference and frictionally supported in the sleeve 22 to form a space concentric with the internal wall of the sleeve 22. Communicating with this space are the slots 30 disposed in the end 26 of the sleeve and, to impart structural strength as well as to efficiently distribute the flow of air therethrough, the slots 30 are preferably positioned alternately of the indentations 28. This space serves to effectively insulate the sleeve from the intense heat emanating from the carbon tip during operation of the tool, while at the same time the tip 32 is adjustably secured in the sleeve 22 by frictional engagement.

It is understood that my invention is not limited to the particular construction herein illustrated and described but includes such modifications thereof, including arrangement of parts, omissions or additions, and selection of materials, as fall within the scope of the following claims.

I claim:

1. An electric soldering device having an electrically insulated handle, an electric current conducting hollow sleeve supported at one end by said handle, and a carbon tip coaxially supported within the other end of said sleeve and spaced from the interior walls thereof to form a heat insulating air space between the carbon tip and the sleeve, and a slotted portion in said sleeve communicating said space with the atmosphere.

2. An electric soldering device having an electrically insulated handle, a hollow sleeve supported at one end by said handle, inwardly extending electric current conducting means provided at a plurality of spaced points in the length of said sleeve and integral with said sleeve, and a carbon tip received in the other end of said hollow sleeve adjustably supported therein as a plurality of spaced points in its length by frictional engagement with said inwardly extending electric current conducting means.

3. An electric soldering device having an electrically insulated handle, an electric current conducting hollow sleeve supported at one end by said handle and having a series of axially arranged slots at its free end, the free end of said sleeve being tapered inwardly and a body portion of said sleeve proximate its free end being indented inwardly, and a carbon tip supported within said hollow sleeve and spaced from the walls thereof by engagement with the inwardly tapered free end and the inwardly indented body portion, said slots communicating said space with the atmosphere.

4. An electric soldering device having an electrically insulated handle, an electric current conducting hollow sleeve supported at one end by said handle and having a series of axially arranged slots at its free end, a series of inwardly projecting protuberances provided on the body portion of the sleeve and circumferentially arranged alternately of said slots, and a carbon tip supported within said hollow sleeve and spaced from the walls thereof by engagement with the inwardly projecting protuberances, said slots communicating said space with the atmosphere.

5. An electric soldering device having an electrically insulated handle, an electric current conducting hollow sleeve supported at one end by said handle and having an inwardly tapered free end, a plurality of inwardly projecting protuberances provided on the body portion of said sleeve, a carbon tip telescoped within said sleeve, said tip being frictionally held therein by engagement with said protuberances and said tapered end and spaced from the remainder of said sleeve, and a slotted portion in the wall of said sleeve opening into said space.

6. An electric soldering device having an electrically insulated handle, an electric current conducting hollow sleeve supported at one end by said handle and having an inwardly tapered free end, a series of inwardly projecting protuberances provided on the body portion of said sleeve, and a carbon tip telescoped within said sleeve, said tip being frictionally held therein by engagement with said protuberances and said tapered end and spaced from the remainder of said sleeve.

BERTRAND F. BRUGGERMAN.